(12) United States Patent
Tomioka

(10) Patent No.: US 7,046,454 B2
(45) Date of Patent: May 16, 2006

(54) TWO-GROUP ZOOM LENS

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/819,226

(22) Filed: Apr. 7, 2004

(65) Prior Publication Data

US 2004/0207929 A1    Oct. 21, 2004

(30) Foreign Application Priority Data

Apr. 18, 2003    (JP) ............... 2003-113635

(51) Int. Cl.
*G02B 15/14* (2006.01)
(52) U.S. Cl. .............. 359/691; 359/682
(58) Field of Classification Search ........... 359/691, 359/680–682, 676, 683
See application file for complete search history.

(56) References Cited

U.S. PATENT DOCUMENTS

| | | | |
|---|---|---|---|
| 5,381,268 A | 1/1995 | Sato | 359/691 |
| 6,441,967 B1 | 8/2002 | Furuta | 359/684 |
| 6,809,882 B1 * | 10/2004 | Takatsuki | 359/691 |
| 6,888,682 B1 * | 5/2005 | Kawakami | 359/651 |
| 2005/0078380 A1 * | 4/2005 | Tomioka | 359/680 |

FOREIGN PATENT DOCUMENTS

JP    2002-207166    7/2002

* cited by examiner

*Primary Examiner*—Jordan M. Schwartz
(74) *Attorney, Agent, or Firm*—Arnold International; Jon W. Henry; Bruce Y. Arnold

(57) ABSTRACT

A compact two-group zoom lens that corrects aberrations in the visible and the near-infrared regions and that provides a comparatively high aperture ratio includes, in order from the object side, a first lens group of negative refractive power and a second lens group of positive refractive power. Both lens groups include three lens components and four lens elements. The first lens group includes, in order from the object side, lens elements having negative, negative, negative, and positive refractive powers, respectively. The second lens group includes, in order from the object side, lens elements having positive, positive, negative, and positive refractive powers, respectively. Aspheric surfaces are disclosed. Certain conditions relating to the focal lengths of the two lens groups, and the index of refraction and Abbe number of one lens element are satisfied to control aberrations in both the visible and the near-infrared regions.

13 Claims, 3 Drawing Sheets

Spherical Aberration

Astigmatism

Distortion

Spherical Aberration

Astigmatism

Distortion

Spherical Aberration

Astigmatism

Distortion

Spherical Aberration

Astigmatism

Distortion

TWO-GROUP ZOOM LENS

Lens systems for use in surveillance cameras, such as closed circuit television cameras (CCTV), both during the day and at night have been desired. Usually, an image is obtained using visible light during the day and near-infrared light at night. Therefore, lens systems with good image performance in both the visible light region and the near-infrared region are necessary.

In common lens systems designed for the visible light region, aberrations, particularly chromatic aberrations generated in the near-infrared region, cause the focus to undesirably shift during imaging at night. In order to avoid this undesirable focus shift, chromatic aberrations must be favorably corrected, especially in the near-infrared region and the visible light region for lens systems used in surveillance cameras.

Japanese Laid-Open Patent Application 2002-207166 describes a conventional zoom lens for correcting chromatic aberrations in the visible light region and in the near-infrared region. The zoom lens described in Japanese Laid-Open Patent Application 2002-207166 is a two-group zoom lens that includes an object-side lens group having negative refractive power and an image-side lens group having positive refractive power. The object-side lens group includes two lens components and three lens elements and the image-side lens group includes five lens components and six lens elements.

Along with chromatic aberrations being favorably corrected in both the visible light region and the near-infrared region, there is a demand for surveillance camera lens systems that provide a bright image even at low light levels through use of a large aperture ratio, as well as miniaturization of the lens system. Accordingly, development of such lens systems is desired.

BRIEF SUMMARY OF THE INVENTION

The present invention relates to a compact zoom lens that favorably corrects aberrations in both the visible light region and the near-infrared region and provides comparatively bright imaging with a relatively large aperture ratio. Additionally, the present invention relates to such a compact zoom lens that is particularly suitable for surveillance imaging in both the visible light region and the near-infrared region.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
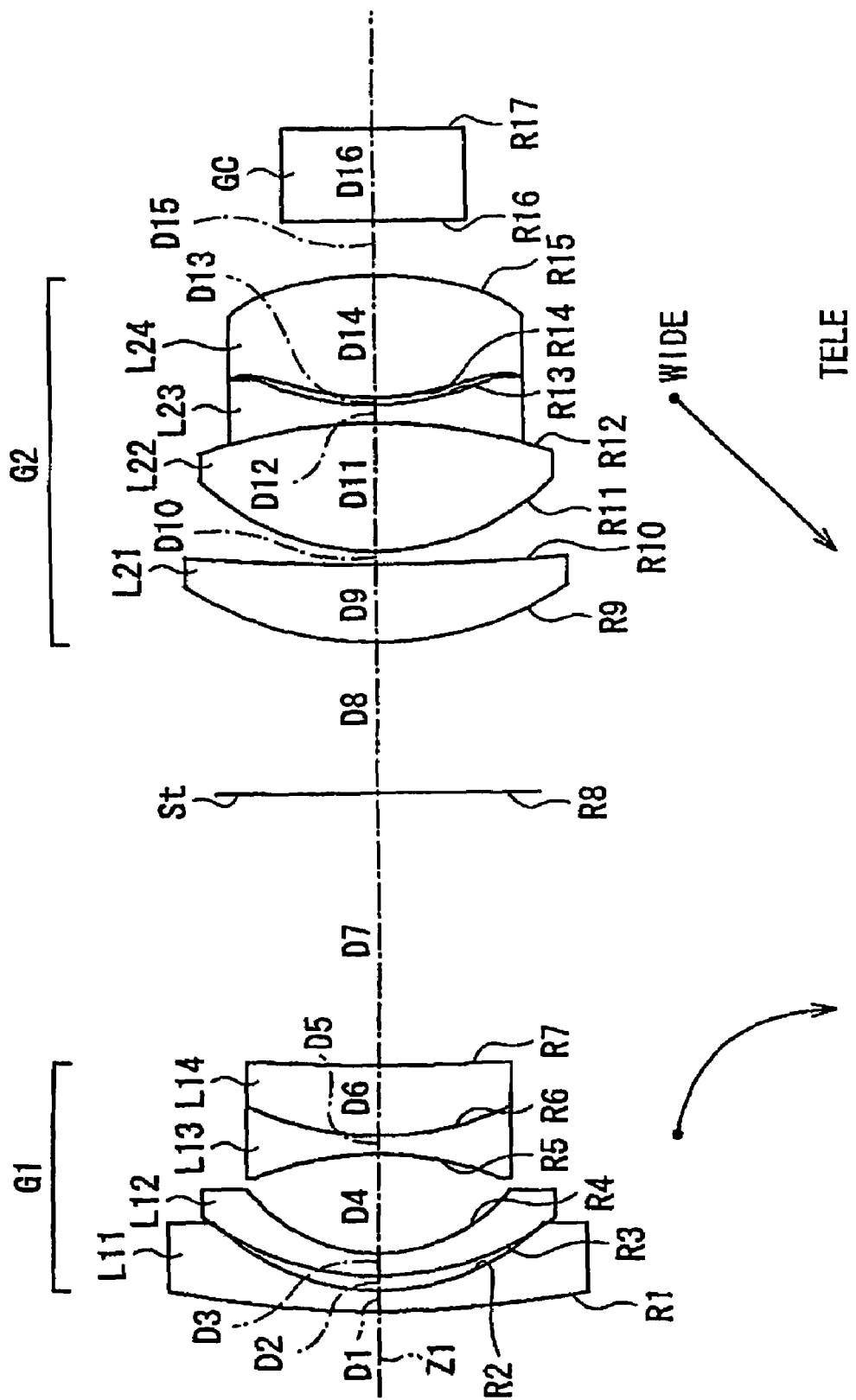
FIG. 1 shows a cross-sectional view of Embodiment 1 of the zoom lens of the present invention at the wide-angle end.

A general description of the two-group zoom lens of the present invention that pertains to both embodiments of the invention will first be described with reference to FIG. 1 that shows Embodiment 1. In FIG. 1, lens elements are referenced by the letter L followed by a number denoting their order from the object side of the zoom lens along the optical axis Z1, from L11 to L14 and from L21 to L24. Similarly, radii of curvature of the surfaces of the various optical elements, including the lens surfaces, are referenced by the letter R followed by a number denoting their order from the object side of the zoom lens, from R1 to R17. The on-axis surface spacings along the optical axis Z1 of the various optical surfaces are referenced by the letter D followed by a number denoting their order from the object side of the zoom lens, from D1 to D16. In the same manner, the two lens groups are labeled G1 and G2 in order from the object side of the zoom lens and the lens components belonging to each lens group are indicated by the brackets adjacent the labels G1 and G2.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, a diaphragm stop St that controls the amount of light that passes through the zoom lens is included between the lens groups G1 and G2. Also as shown in FIG. 1, a cover glass GC is arranged on the image side of the second lens group G2.

The zoom lens is designed for use in both the visible light region and the near-infrared region and is particularly suited for mounting in a surveillance camera for use both during the day and at night. As shown in FIG. 1, the two-group zoom lens of the present invention includes, in order from the object side, a first lens group G1 having negative refractive power and a second lens group G2 having positive refractive power.

An image pickup element (not shown in the drawings), such as a CCD (Charge-Coupled Device) or CMOS (Complementary Metal-Oxide Semiconductor), is arranged at an image plane (not shown in the drawings) on the image side of the cover glass GC. Various other optical elements may also be arranged between the second lens group G2 and the image plane.

The two-group zoom lens zooms from the wide-angle end to the telephoto end by moving the second lens group G2 toward the object side along the optical axis Z1 in order to change the focal length of the zoom lens, and compensates for movement of the image plane caused by movement of the second lens group G2 by moving the first lens group G1 toward the image side during zooming from the wide-angle end to the telephoto end of the zoom range. Downward arrows at the bottom of FIG. 1 show the directions of movement along the optical axis Z1 of the first lens group G1 and the second lens group G2 when zooming from the wide-angle end to the telephoto end, as indicated by the symbols "WIDE" and "TELE", respectively, in FIG. 1. The first lens group G1 also functions as a focusing lens group.

Preferably, the zoom lens satisfies the following condition:

$$0.5 < |f1/f2| < 0.8 \quad \text{Condition (1)}$$

where f1 is the focal length of the first lens group G1, and f2 is the focal length of the second lens group G2.

Aberrations are readily corrected and the zoom lens may be kept compact by satisfying Condition (1). If the value of Condition (1) does not satisfy the upper limit of Condition (1), the refractive power of the first lens group G1 becomes too weak and the first lens group must be moved too far during zooming so that compactness of the zoom lens cannot be maintained. If the value of Condition (1) does not satisfy the lower limit of Condition (1), the refractive power of the first lens group becomes too strong and sufficient correction of spherical aberration at the telephoto end cannot be achieved.

The first lens group G1 includes three lens components and four lens elements, in order from the object side, as follows: a first lens element L11 having negative refractive power; a second lens element L12 having negative refractive power; and a lens component that includes, in order from the object side, a third lens element L13 having negative refractive power that is intimately bonded to a fourth lens element L14 having positive refractive power. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lenses together, the latter being commonly referred to as a "cemented" lens element arrangement.

In the first lens group G1, the first lens element L11 and the second lens element L12 are meniscus lens elements with the convex surface on the object side, the third lens element L13 is a biconcave lens element, and the fourth lens element L14 is a meniscus lens element with the convex surface on the object side.

The second lens group G2 includes, in order from the object side, a first lens element L21 having positive refractive power, a lens component that includes, in order from the object side, a second lens element L22 having positive refractive power that is intimately bonded to a third lens element L23 having negative refractive power, and a fourth lens element L24 having positive refractive power, arranged on the image side of the zoom lens, and having at least one aspheric surface.

In the second lens group G2, the first lens element L21 is a meniscus lens element with the convex surface on the object side, the second lens element L22 is a biconvex lens element, and the third lens element L23 is a biconcave lens element. The fourth lens element L24 has a biconvex shape near the optical axis. When the surface on the object side of the fourth lens element L24 is made to be aspheric, it is preferable that the surface on the object side have a shape so that the positive refractive power becomes weaker toward the periphery of the lens element.

Preferably, the second lens element L22 of the second lens group G2 satisfies the following conditions:

$$N_{d22} < 1.55 \quad \text{Condition (2)}$$

$$\nu_{d22} > 65 \quad \text{Condition (3)}$$

where $N_{d22}$ is the index of refraction at the d-line (587.6 nm) of the second lens element L22 of the second lens group G2, and $\nu_{d22}$ is the Abbe number at the d-line (587.6 nm) of the second lens element L22 of the second lens group G2.

With this zoom lens, the generation of axial chromatic aberration is especially restrained by using the two-element lens components of the first lens group G1 and the second lens group G2. Conditions (2) and (3) above prescribe the appropriate kind of glass for the second lens element L22 of the second lens group G2. Additionally, axial chromatic aberration can be favorably corrected in both the visible light region and the near-infrared region by properly selecting the kind of glass so as to satisfy Conditions (2) and (3) so that a zoom lens with high optical performance in both these regions can be obtained.

In order to improve imaging, at least some of the lens surfaces of the two-group zoom lens are aspheric lens surfaces. All the aspheric lens surfaces of the zoom lens are defined using the following equation:

$$Z = [(C \cdot Y^2)/\{1 + (1 - K \cdot C^2 \cdot Y^2)^{1/2}\}] + \Sigma(A_i \cdot Y^i) \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends over i equals three to ten.

In embodiments of the invention disclosed below, only aspheric coefficients $A_3$–$A_{10}$ are non-zero.

With the zoom lens of the present invention, the correction of aberrations, especially the correction of spherical aberration and lateral color at the telephoto end, are achieved more easily while achieving sufficient compactness by the first lens group G1 having a three component, four element construction, as compared to a two component, three ele ment construction. Additionally, compactness and a large aperture ratio are readily achieved by providing the fourth lens element L24 of the second lens group G2, which lens element has positive refractive power, with an aspheric surface on the image side, thus providing an aspheric surface on the image-side lens surface of the second lens group G2.

Thus, the zoom lens of the present invention enables a small size and large aperture ratio while obtaining an optical performance suitable for a surveillance camera that operates in both the visible light region and the near-infrared region with more detailed construction determined by the particular demands of use. For example, the zoom lens may be designed so that no focus adjustment is needed when ambient light conditions change from bright to low light levels or when ambient light conditions change from visible light to near-infrared.

Embodiments 1 and 2 of the present invention will now be individually described with further reference to the drawings.

EMBODIMENT 1

Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1.

TABLE 1

| #   | R       | D            | $N_d$             | $v_d$           |
|-----|---------|--------------|-------------------|-----------------|
| 1   | 35.912  | 0.750        | 1.69680           | 55.5            |
| 2   | 7.724   | 0.500        |                   |                 |
| 3   | 9.596   | 0.800        | 1.69895           | 30.1            |
| 4   | 5.536   | 3.557        |                   |                 |
| 5   | −10.500 | 0.640        | 1.49700           | 81.6            |
| 6   | 9.821   | 2.580        | 1.84666           | 23.8            |
| 7   | 64.005  | D7 (variable)|                   |                 |
| 8   | ∞ (stop)| D8 (variable)|                   |                 |
| 9   | 10.978  | 2.899        | 1.72916           | 54.7            |
| 10  | 74.972  | 0.485        |                   |                 |
| 11  | 8.228   | 4.609        | 1.49700 ($N_{d22}$) | 81.6 ($v_{d22}$) |
| 12  | −17.962 | 0.650        | 1.84666           | 23.8            |
| 13  | 9.189   | 0.258        |                   |                 |
| 14* | 7.274   | 4.356        | 1.69350           | 53.2            |
| 15* | −11.868 | D15 (variable)|                  |                 |
| 16  | ∞       | 3.320        | 1.51633           | 64.1            |
| 17  | ∞       |              |                   |                 |

The surfaces with a * to the right of the surface number in Table 1 are aspheric lens surfaces, and the aspheric surface shape is expressed by Equation (A) above. As indicated in Table 1, both surfaces of the fourth lens element L24 of the second lens group G2 are aspheric.

Table 2 below lists the values of the constants K, and $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| #  | K          | $A_3$          | $A_4$         | $A_5$          | $A_6$         |
|----|------------|----------------|---------------|----------------|---------------|
| 14 | −0.3119479 | −0.1218642E−2  | 0.7246816E−3  | −0.6302984E−3  | 0.7570227E−4  |
| 15 | −2.2183366 | −0.1553495E−2  | 0.1292285E−2  | −0.5186717E−3  | 0.3768057E−4  |

| #  | $A_7$         | $A_8$          | $A_9$          | $A_{10}$        |
|----|---------------|----------------|----------------|-----------------|
| 14 | 0.1189115E−4  | −0.3574370E−5  | −0.2590567E−6  | 0.5284200E−7    |
| 15 | 0.3353471E−5  | 0.1270727E−6   | −0.1234525E−6  | −0.1419697E−7   |

In the zoom lens of Embodiment 1, both the first lens group G1 and the second lens group G2 move during zooming. Therefore, the on-axis spacings D7, D8, and D15 change with zooming. With zooming, the focal length f, the f-number $F_{NO}$, and the field angle $2\omega$ of the zoom lens also change. Table 3 below lists the values of the focal length f (in mm), the f-number $F_{NO}$, the field angle $2\omega$ (in degrees), and the variables D7, D8, and D15 (in mm) at the wide-angle end (f=2.49 mm) and the telephoto end (f=5.68 mm) when the zoom lens is focused at infinity.

TABLE 3

| f    | $F_{NO}$ | $2\omega$ | D7   | D8   | D15  |
|------|----------|-----------|------|------|------|
| 2.49 | 0.95     | 114       | 9.93 | 5.48 | 2.00 |
| 5.68 | 1.53     | 46        | 2.10 | 0.88 | 6.60 |

The zoom lens of Embodiment 1 of the present invention satisfies Conditions (1)–(3) above as set forth in Table 4 below.

TABLE 4

| Condition No. | Condition           | Value   |
|---------------|---------------------|---------|
| (1)           | 0.5 < |f1/f2| < 0.8 | 0.69    |
| (2)           | $N_{d22}$ < 1.55    | 1.49700 |
| (3)           | $v_{d22}$ > 65      | 81.6    |

Figure 2A:
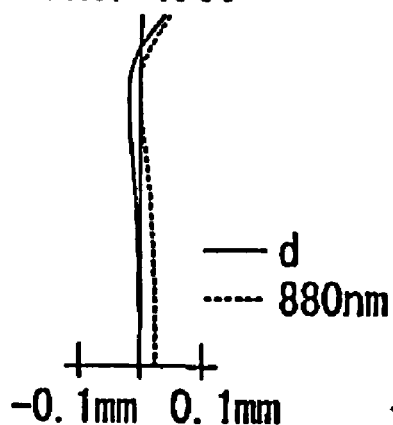
FIGS. 2A–2C show aberrations of Embodiment 1 of the zoom lens of the present invention at the wide-angle end.
Figure 2B:
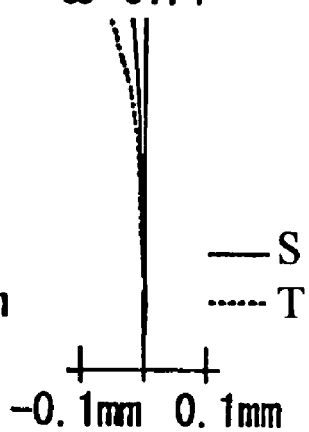
Figure 2C:
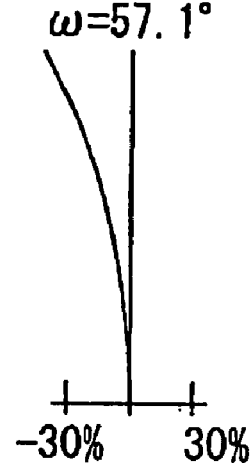
Figure 3A:
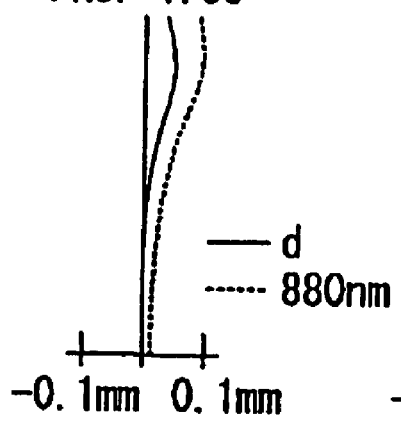
FIGS. 3A–3C show aberrations of Embodiment 1 of the zoom lens of the present invention at the telephoto end.
Figure 3B:
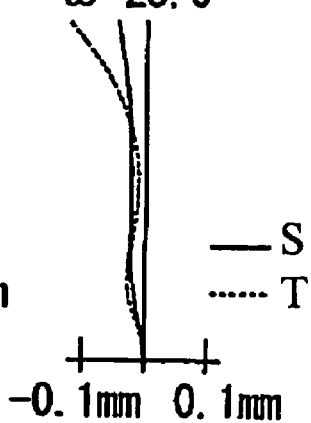
Figure 3C:
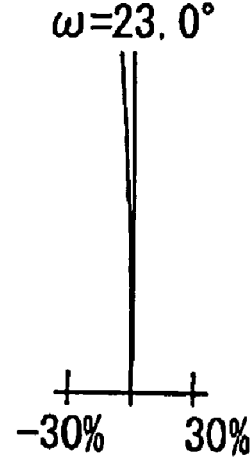

FIGS. 2A–2C show the spherical aberration, astigmatism, and distortion, respectively, of the zoom lens of Embodiment 1 at the wide-angle end. FIGS. 3A–3C show the spherical aberration, astigmatism, and distortion, respectively, of the zoom lens of Embodiment 1 at the telephoto end. In FIGS. 2A and 3A, the spherical aberration is shown for the wavelengths 587.6 nm (the d-line) and 880 nm. In FIGS. 2B, 2C, 3B, and 3C, $\omega$ is the half-field angle. In FIGS. 2B and 3B, the astigmatism is shown for the sagittal image surface S and the tangential image surface T. In FIGS. 2C and 3C, distortion is measured at 587.6 nm (the d-line). As is apparent from these figures, the various aberrations are favorably corrected over the entire range of zoom and in both the visible light and near-infrared regions with the compact zoom lens with a relatively large aperture ratio of Embodiment 1.

EMBODIMENT 2

Embodiment 2 is very similar to Embodiment 1 and therefore only the differences between Embodiment 2 and Embodiment 1 will be explained. Embodiment 2 differs from Embodiment 1 in its lens element configuration such as some different radii of curvature of the lens surfaces, different eccentricities and aspheric coefficients of the aspheric lens surfaces, some different optical element surface spacings, some different refractive indexes, and some different Abbe numbers of the optical materials of the lens elements.

Table 5 below lists the surface number #, in order from the object side, the radius of curvature R (in mm) of each surface near the optical axis, the on-axis surface spacing D (in mm), as well as the refractive index $N_d$ and the Abbe number $V_d$ (both at the d-line of 587.6 nm) of each optical element for Embodiment 2.

TABLE 5

| # | R | D | $N_d$ | $v_d$ |
|---|---|---|---|---|
| 1 | 27.798 | 0.750 | 1.75500 | 52.3 |
| 2 | 7.962 | 0.500 | | |
| 3 | 9.615 | 0.800 | 1.75520 | 27.5 |
| 4 | 5.550 | 3.557 | | |
| 5 | −10.500 | 0.640 | 1.49700 | 81.6 |
| 6 | 9.821 | 2.580 | 1.84666 | 23.8 |
| 7 | 64.005 | D7 (variable) | | |
| 8 | ∞ (stop) | D8 (variable) | | |
| 9 | 11.047 | 2.882 | 1.69680 | 55.5 |
| 10 | 74.985 | 0.438 | | |
| 11 | 7.821 | 4.739 | 1.49700 ($N_{d22}$) | 81.6 ($v_{d22}$) |
| 12 | −19.779 | 0.650 | 1.84666 | 23.8 |
| 13 | 8.808 | 0.301 | | |
| 14* | 7.124 | 4.265 | 1.69350 | 53.2 |
| 15* | −11.945 | D15 (variable) | | |
| 16 | ∞ | 3.320 | 1.51633 | 64.1 |
| 17 | ∞ | | | |

The surfaces with a * to the right of the surface number in Table 5 are aspheric lens surfaces, and the aspheric surface shape is expressed by Equation (A) above. As indicated in Table 5, both surfaces of the fourth lens element L24 of the second lens group G2 are aspheric.

Table 6 below lists the values of the constants K, and $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E−2" represents the number $1.0 \times 10^{-2}$.

TABLE 6

| # | K | $A_3$ | $A_4$ | $A_5$ | $A_6$ |
|---|---|---|---|---|---|
| 14 | −0.4878057 | −0.9808512E−3 | 0.3104345E−3 | −0.3942310E−3 | 0.2909605E−4 |
| 15 | −2.4098731 | −0.1634326E−2 | 0.1315548E−2 | −0.5586721E−3 | 0.4228572E−4 |

| # | $A_7$ | $A_8$ | $A_9$ | $A_{10}$ |
|---|---|---|---|---|
| 14 | 0.1191683E−4 | −0.3296691E−5 | −0.2360361E−6 | 0.5284274E−7 |
| 15 | 0.3792502E−5 | 0.3222287E−7 | −0.1321672E−6 | −0.1398418E−7 |

In the zoom lens of Embodiment 2, both the first lens group G1 and the second lens group G2 move during zooming. Therefore, the on-axis spacings D7, D8, and D15 change with zooming. With zooming, the focal length f, the f-number $F_{NO}$, and the field angle 2ω of the zoom lens also change. Table 7 below lists the values of the focal length f (in mm), the f-number $F_{NO}$, the field angle 2ω (in degrees), and the variables D7, D8, and D15 (in mm) at the wide-angle end (f=2.49 mm) and the telephoto end (f=5.69 mm) when the zoom lens is focused at infinity.

TABLE 7

| f | $F_{NO}$ | 2ω | D7 | D8 | D15 |
|---|---|---|---|---|---|
| 2.49 | 0.95 | 112 | 9.93 | 5.46 | 2.00 |
| 5.69 | 1.53 | 46 | 2.11 | 0.85 | 6.61 |

The zoom lens of Embodiment 2 of the present invention satisfies Conditions (1)–(3) above as set forth in Table 8 below.

TABLE 8

| Condition No. | Condition | Value |
|---|---|---|
| (1) | 0.5 < |f1/f2| < 0.8 | 0.69 |
| (2) | $N_{d22}$ < 1.55 | 1.49700 |
| (3) | $v_{d22}$ > 65 | 81.6 |

Figure 4A:
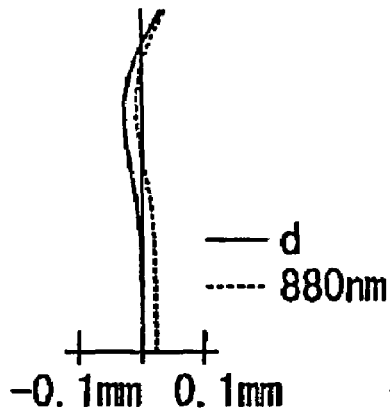
FIGS. 4A–4C show aberrations of Embodiment 2 of the zoom lens of the present invention at the wide-angle end.
Figure 4B:
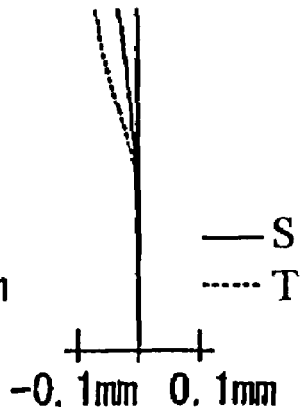
Figure 4C:
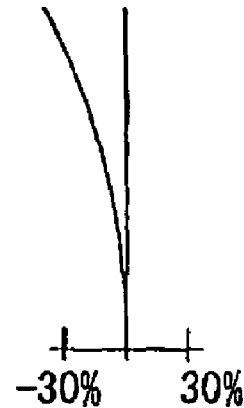
Figure 5A:
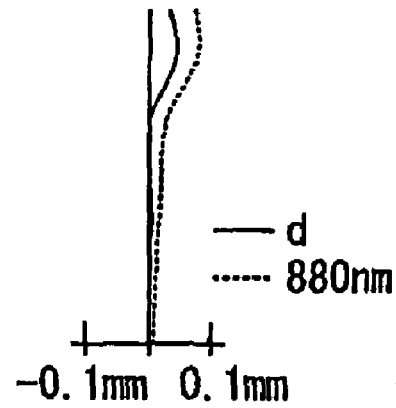
FIGS. 5A–5C show aberrations of Embodiment 2 of the zoom lens of the present invention at the telephoto end.
Figure 5B:
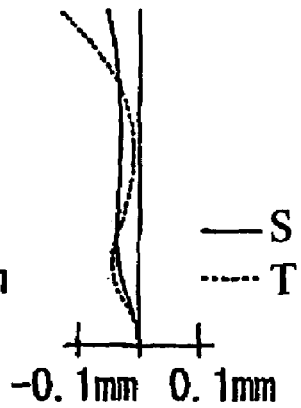
Figure 5C:
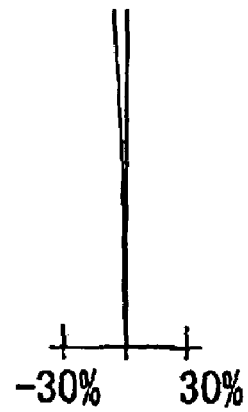

FIGS. 4A–4C show the spherical aberration, astigmatism, and distortion, respectively, of the zoom lens of Embodiment 2 at the wide-angle end. FIGS. 5A–5C show the spherical aberration, astigmatism, and distortion, respectively, of the zoom lens of Embodiment 2 at the telephoto end. In FIGS. 4A and 5A, the spherical aberration is shown for the wavelengths 587.6 nm (the d-line) and 880 nm. In FIGS. 4B, 4C, 5B, and 5C, ω is the half-field angle. In FIGS. 4B and 5B, the astigmatism is shown for the sagittal image surface S and the tangential image surface T. In FIGS. 4C and 5C, distortion is measured at 587.6 nm (the d-line). As is apparent from these figures, the various aberrations are favorably corrected over the entire range of zoom and in both the visible light and near-infrared regions with the compact zoom lens with a relatively large aperture ratio of Embodiment 2.

The present invention is not limited to the aforementioned embodiments, as it will be obvious that various alternative implementations are possible. For instance, values such as the radius of curvature R of each of the lens components, the surface spacings D, the refractive index N, as well as the Abbe number v, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only two lens groups, arranged along an optical axis in order from the object side as follows:

a first lens group having negative refractive power; and
a second lens group having positive refractive power;
wherein
during zooming from the wide-angle end to the telephoto end, the first lens group moves along the optical axis toward the image side and the second lens group moves along the optical axis toward the object side;
the first lens group includes, arranged along the optical axis in order from the object side, a first lens component having negative refractive power that includes a first lens element, a second lens component having negative refractive power that includes a second lens element, and a third lens component that includes, in order from the object side, a third lens element having negative refractive power and a fourth lens element having positive refractive power;
the second lens group includes, arranged along the optical axis in order from the object side, a first lens component having positive refractive power that includes a first lens element, a second lens component that includes, in order from the object side, a second lens element having positive refractive power and a third lens element having negative refractive power, and a third lens component having positive refractive power that includes a fourth lens element having an aspheric surface on its image side, said second lens group including only three lens components and only four lens elements; and
the following condition is satisfied:

$$0.5 < |f1/f2| < 0.8$$

where
f1 is the focal length of the first lens group, and
f2 is the focal length of the second lens group.

2. The zoom lens of claim 1, wherein the second lens element of the second lens group satisfies the following conditions:

$$N_d < 1.55$$

$$v_d > 65$$

where
$N_d$ is the index of refraction, at the d-line wavelength of 587.6 nm, of the second lens element of the second lens group, and
$v_d$ is the Abbe number, at the d-line wavelength of 587.6 nm, of the second lens element of the second lens group.

3. A zoom lens formed of only two lens groups, arranged along an optical axis in order from the object side as follows:
a first lens group having negative refractive power; and
a second lens group having positive refractive power;
wherein
during zooming from the wide-angle end to the telephoto end, the first lens group moves along the optical axis toward the image side and the second lens group moves along the optical axis toward the object side;
the first lens group includes only three lens components, arranged along the optical axis in order from the object side, namely, a first lens component having negative refractive power that includes a first lens element, a second lens component having negative refractive power that includes a second lens element, and a third lens component that includes, in order from the object side, a third lens element having negative refractive power and a fourth lens element having positive refractive power;
the second lens group includes, arranged along the optical axis in order from the object side, a first lens component having positive refractive power that includes a first lens element, a second lens component that includes, in order from the object side, a second lens element having positive refractive power and a third lens element having negative refractive power, and a third lens component having positive refractive power that includes a fourth lens element having an aspheric surface on its image side; and
the following condition is satisfied:

$$0.5 < |f1/f2| < 0.8$$

where
f1 is the focal length of the first lens group, and
f2 is the focal length of the second lens group.

4. The zoom lens of claim 3, wherein the second lens group includes only three lens components.

5. The zoom lens of claim 4, wherein the second lens group includes only four lens elements.

6. The zoom lens of claim 5, wherein the second lens element of the second lens group satisfies the following conditions:

$$v_d < 1.55$$

$$N_d > 65$$

where
$N_d$ is the index of refraction, at the d-line wavelength of 587.6 nm, of the second lens element of the second lens group, and
$v_d$ is the Abbe number, at the d-line wavelength of 587.6 nm, of the second lens element of the second lens group.

7. A zoom lens formed of only two lens groups, arranged along an optical axis in order from the object side as follows:
a first lens group having negative refractive power; and
a second lens group having positive refractive power;
wherein
during zooming from the wide-angle end to the telephoto end, the first lens group moves along the optical axis toward the image side and the second lens group moves along the optical axis toward the object side;
the first lens group includes only three lens components and four lens elements, arranged along the optical axis in order from the object side as follows, a first lens component having negative refractive power that includes a first lens element, a second lens component having negative refractive power that includes a second lens element, and a third lens component that includes, in order from the object side, a third lens element having negative refractive power and a fourth lens element having positive refractive power;
the second lens group includes, arranged along the optical axis in order from the object side, a first lens component having positive refractive power that includes a first lens element, a second lens component that includes, in order from the object side, a second lens element having positive refractive power and a third lens element having negative refractive power, and a third lens component having positive refractive power that includes a fourth lens element having an aspheric surface on its image side; and
the following condition is satisfied:

$$0.5 < |f1/f2| < 0.8$$

where
f1 is the focal length of the first lens group, and
f2 is the focal length of the second lens group.

8. The zoom lens of claim 7, wherein the second lens group includes only three lens components.

9. The zoom lens of claim 8, wherein the second lens group includes only four lens elements.

10. A zoom lens formed of only two lens groups, arranged along an optical axis in order from the object side as follows:
   a first lens group having negative refractive power; and
   a second lens group having positive refractive power; wherein
   during zooming from the wide-angle end to the telephoto end, the first lens group moves along the optical axis toward the image side and the second lens group moves along the optical axis toward the object side;
   the second lens group includes, arranged along the optical axis in order from the object side, a first lens component having positive refractive power that includes a first lens element, a second lens component that includes, in order from the object side, a second lens element having positive refractive power and a third lens element having negative refractive power, and a third lens component having positive refractive power that includes a fourth lens element having an aspheric surface on its image side; said second lens group including only three lens components and only four lens elements; and
   the following condition is satisfied:

$0.5 < |f1/f2| < 0.8$ where
   f1 is the focal length of the first lens group, and
   f2 is the focal length of the second lens group.

11. The zoom lens of claim 10, wherein the second lens element of the second lens group satisfies the following conditions:

$N_d < 1.55$ $v_d > 65$ where
   $N_d$ is the index of refraction, at the d-line wavelength of 587.6 nm, of the second lens element of the second lens group, and
   $V_d$ is the Abbe number, at the d-line wavelength of 587.6 nm, of the second lens element of the second lens group.

12. A zoom lens formed of only two lens groups, arranged along an optical axis in order from the object side as follows:
   a first lens group having negative refractive power; and
   a second lens group having positive refractive power; wherein
   during zooming from the wide-angle end to the telephoto end, the first lens group moves along the optical axis toward the image side and the second lens group moves along the optical axis toward the object side;
   the first lens group includes, arranged along the optical axis in order from the object side, a first lens component having negative refractive power that includes a first lens element, a second lens component having negative refractive power that includes a second lens element, and a third lens component that includes, in order from the object side, a third lens element having negative refractive power and a fourth lens element having positive refractive power;
   the second lens group includes, arranged along the optical axis in order from the object side, a first lens component having positive refractive power that includes a first lens element, a second lens component that includes, in order from the object side, a second lens element having positive refractive power and a third lens element having negative refractive power, and a third lens component having positive refractive power that includes a fourth lens element having an aspheric surface on its image side; and
   the following condition is satisfied:

$0.5 < |f1/f2| < 0.8$ where
   f1 is the focal length of the first lens group, and
   f2 is the focal length of the second lens group; and
   the second lens element of the second lens group satisfies the following conditions:

$N_d < 1.55$ $v_d > 65$ where
   $N_d$ is the index of refraction, at the d-line wavelength of 587.6 nm, of the second lens element of the second lens group, and
   $v_d$ is the Abbe number, at the d-line wavelength of 587.6 nm, of the second lens element of the second lens group.

13. A zoom lens formed of only two lens groups, arranged along an optical axis in order from the object side as follows:
   a first lens group having negative refractive power; and
   a second lens group having positive refractive power; wherein
   during zooming from the wide-angle end to the telephoto end, the first lens group moves along the optical axis toward the image side and the second lens group moves along the optical axis toward the object side;
   the second lens group includes, arranged along the optical axis in order from the object side, a first lens component having positive refractive power that includes a first lens element, a second lens component that includes, in order from the object side, a second lens element having positive refractive power and a third lens element having negative refractive power, and a third lens component having positive refractive power that includes a fourth lens element having an aspheric surface on its image side; and
   the following condition is satisfied:

$0.5 < |f1/f2| < 0.8$ where
   f1 is the focal length of the first lens group, and
   f2 is the focal length of the second lens group; and
   the second lens element of the second lens group satisfies the following conditions:

$N_d < 1.55$ $v_d > 65$ where
   $N_d$ is the index of refraction, at the d-line wavelength of 587.6 nm, of the second lens element of the second lens group, and
   $v_d$ is the Abbe number, at the d-line wavelength of 587.6 nm, of the second lens element of the second lens group.

* * * * *